United States Patent
Roberts et al.

(10) Patent No.: US 9,914,172 B2
(45) Date of Patent: Mar. 13, 2018

(54) INTERLOCKING MATERIAL TRANSITION ZONE WITH INTEGRATED FILM COOLING

(71) Applicant: General Electric Company, Schenectady, NY (US)

(72) Inventors: Herbert Chidsey Roberts, Middletown, OH (US); Richard William Albrecht, Jr., Fairfield, OH (US); Michael John McCarren, South Lebanon, OH (US); Peter Andrew Flynn, Delmar, NY (US); Michael Francis Xavier Gigliotti, Jr., Glenville, NY (US); Eric Alan Estill, Morrow, OH (US)

(73) Assignee: General Electric Company, Schenectady, NY (US)

( * ) Notice: Subject to any disclaimer, the term of this patent is extended or adjusted under 35 U.S.C. 154(b) by 159 days.

(21) Appl. No.: 14/887,459

(22) Filed: Oct. 20, 2015

(65) Prior Publication Data

US 2017/0106587 A1    Apr. 20, 2017

(51) Int. Cl.
| | |
|---|---|
| *B29C 67/00* | (2017.01) |
| *B22F 7/06* | (2006.01) |
| *B28B 1/00* | (2006.01) |
| *B22F 3/105* | (2006.01) |
| *B29C 64/106* | (2017.01) |
| *B33Y 10/00* | (2015.01) |
| *B33Y 80/00* | (2015.01) |
| *B29K 63/00* | (2006.01) |

(52) U.S. Cl.
CPC .............. *B22F 7/06* (2013.01); *B22F 3/1055* (2013.01); *B28B 1/001* (2013.01); *B29C 64/106* (2017.08); *B29K 2063/00* (2013.01); *B33Y 10/00* (2014.12); *B33Y 80/00* (2014.12); *Y02P 10/295* (2015.11)

(58) Field of Classification Search
CPC ........................................................ B22F 7/06
USPC ............................................................ 428/99
See application file for complete search history.

(56) References Cited

U.S. PATENT DOCUMENTS

| | | |
|---|---|---|
| 1,937,865 A | 12/1933 | Baker |
| 2,790,656 A | 4/1957 | Cook |
| (Continued) | | |

FOREIGN PATENT DOCUMENTS

| | | |
|---|---|---|
| DE | 202 21 061 U1 | 2/2005 |
| DE | 10 2011 084 153 A1 | 4/2013 |
| (Continued) | | |

OTHER PUBLICATIONS

European Search Report and Opinion issued in connection with corresponding EP Application No. 16194274.3 on Feb. 16, 2017.

(Continued)

*Primary Examiner* — Brent T O'Hern
(74) *Attorney, Agent, or Firm* — General Electric Company; Brian P. Overbeck

(57) ABSTRACT

A method of joining two components using additive manufacturing is provided. The method includes forming a first component made of a first material; forming an interlocking transition zone from the first material and a second material; and forming a second component made of the second material. The interlocking transition zone includes a plurality of projections alternately extending from the first component and the second component, respectively, to undetachably couple the first component and the second component.

15 Claims, 3 Drawing Sheets

(56) References Cited

U.S. PATENT DOCUMENTS

| | | | |
|---|---|---|---|
| 4,966,421 A | 10/1990 | Mengel | |
| 5,172,504 A | 12/1992 | De Maat et al. | |
| 5,269,057 A | 12/1993 | Mendhem | |
| 5,626,556 A | 5/1997 | Tobler et al. | |
| 5,645,193 A | 7/1997 | Gentile et al. | |
| 5,945,193 A | 8/1999 | Pollard et al. | |
| 6,471,800 B2 | 10/2002 | Jang et al. | |
| 6,521,331 B1 | 2/2003 | Sikorski et al. | |
| 6,905,100 B2 | 6/2005 | Franck et al. | |
| 7,431,976 B2 | 10/2008 | Hermann et al. | |
| 8,114,242 B2 | 2/2012 | Cai et al. | |
| 2007/0086892 A1* | 4/2007 | Tomko | F01D 9/042 415/209.2 |
| 2008/0193709 A1 | 8/2008 | Han | |
| 2011/0033285 A1 | 2/2011 | Turi et al. | |
| 2011/0052412 A1 | 3/2011 | Ader et al. | |
| 2013/0045093 A1 | 2/2013 | Wunderlich et al. | |
| 2013/0247614 A1 | 9/2013 | Thomas | |
| 2013/0276456 A1 | 10/2013 | Propheter-Hinckley et al. | |
| 2014/0011912 A1 | 1/2014 | Petry et al. | |
| 2014/0099476 A1 | 4/2014 | Subramanian et al. | |
| 2014/0127005 A1 | 5/2014 | Schreiber | |
| 2014/0308539 A1 | 10/2014 | Witz et al. | |
| 2015/0021379 A1 | 1/2015 | Albrecht et al. | |
| 2017/0106482 A1* | 4/2017 | Roberts | B23P 6/007 |

FOREIGN PATENT DOCUMENTS

| | | |
|---|---|---|
| EP | 1445426 A2 | 8/2004 |
| EP | 2204547 A1 | 7/2010 |
| EP | 2 719 484 A1 | 4/2014 |
| EP | 2 777 867 A1 | 9/2014 |
| EP | 2 815 823 A1 | 12/2014 |
| EP | 3 050 651 A1 | 8/2016 |
| JP | 5570207 U | 5/1980 |
| JP | 2000027817 A | 1/2000 |
| WO | 2009157817 A1 | 12/2009 |
| WO | 2014158284 A2 | 10/2014 |

OTHER PUBLICATIONS

U.S. Appl. No. 14/887,481, filed Oct. 20, 2015, Roberts, et al.
U.S. Appl. No. 14/887,509, filed Oct. 20, 2015, Roberts, et al.
U.S. Appl. No. 14/887,531, filed Oct. 20, 2015, Roberts, et al.
U.S. Appl. No. 14/887,556, filed Oct. 20, 2015, Roberts, et al.
Extended European Search Report and Opinion issued in connection with corresponding EP Application No. 16194267.7 dated Mar. 30, 2017.
Extended European Search Report and Opinion issued in connection with related EP Application No. 16194269.3 dated Mar. 30, 2017.
Extended European Search Report and Opinion issued in connection with related EP Application No. 16194270.1 dated Mar. 30, 2017.
Extended European Search Report and Opinion issued in connection with related EP Application No. 16194271.9 dated Apr. 4, 2017.
Non-Final Rejection towards related U.S. Appl. No. 14/887,481 dated Jul. 13, 2017.
Office Action issued in connection with related CA Application No. 2945104 dated Jul. 25, 2017.
Office Action issued in connection with related CA Application No. 2945233 dated Jul. 27, 2017.
Office Action issued in connection with Corresponding JP Application No. 2016199623 dated Nov. 21, 2017.

* cited by examiner

INTERLOCKING MATERIAL TRANSITION ZONE WITH INTEGRATED FILM COOLING

FIELD OF THE INVENTION

The present subject matter generally relates to additive manufacturing methods of joining two components along an interlocking transition zone.

BACKGROUND OF THE INVENTION

In manufacturing, it is often desirable to join two or more components to create a single part. However, current methods of joining components, whether these components are made from the same or dissimilar materials, often result in poor mechanical properties.

For example, prior art methods of joining two components may include metal-melting processes such as welding or brazing, using mechanical fasteners such as rivets or screws, or applying and curing a structural adhesive. These joints can exhibit poor physical properties and provide a weak mechanical bond, such as poor shear bonding or adhesion. These joints may also be prone to crack initiation and propagation along the material transition line or plane due to concentrated stresses in those regions.

In addition, in some applications, it is desirable to have a joint that allows some relative movement between joined components. For example, a joint between two or more components that is not pliant or flexible may exhibit issues related to fatigue durability, impact resistance, and overall lifetime of the joint. In cases where the components or joining material have different coefficients of thermal expansion, a joint that allows no relative movement cannot compensate for thermal growth mismatch, thus leading to failure of the joint in certain temperature environments.

Additionally, cooling holes that extend between joined components may be desirable. However, depending on the orientation and configuration of the joint and components, it may not be possible to form cooling holes using current methods, such as drilling or machining, without compromising the integrity of the joint. It may not be possible to create a cooling hole, for example, where the hole is internal to the joint itself or where drilling a hole might otherwise weaken the joint.

Accordingly, a method of joining two or more components with improved structural integrity is desirable. More particularly, a method for forming a joint that allows for relative movement between components or the inclusion of cooling holes if desired, while still providing a strong mechanical bond would be particularly useful.

BRIEF DESCRIPTION OF THE INVENTION

Aspects and advantages of the invention will be set forth in part in the following description, or may be obvious from the description, or may be learned through practice of the invention.

In one exemplary embodiment of the present disclosure, a method is provided for joining two components using additive manufacturing. The method includes forming a first component made of a first material; forming an interlocking transition zone from the first material and a second material; and forming a second component made of the second material. The interlocking transition zone includes a plurality of projections alternately extending from the first component and the second component, respectively, to undetachably couple the first component and the second component.

In another exemplary embodiment of the present disclosure, an additively manufactured component is provided. The additively manufactured component includes a first component including a plurality of fused layers of a first material; a second component including a plurality of fused layers of a second material; and an interlocking transition zone including a plurality of projections alternately extending from the first component and the second component, respectively, to undetachably couple the first component and the second component.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
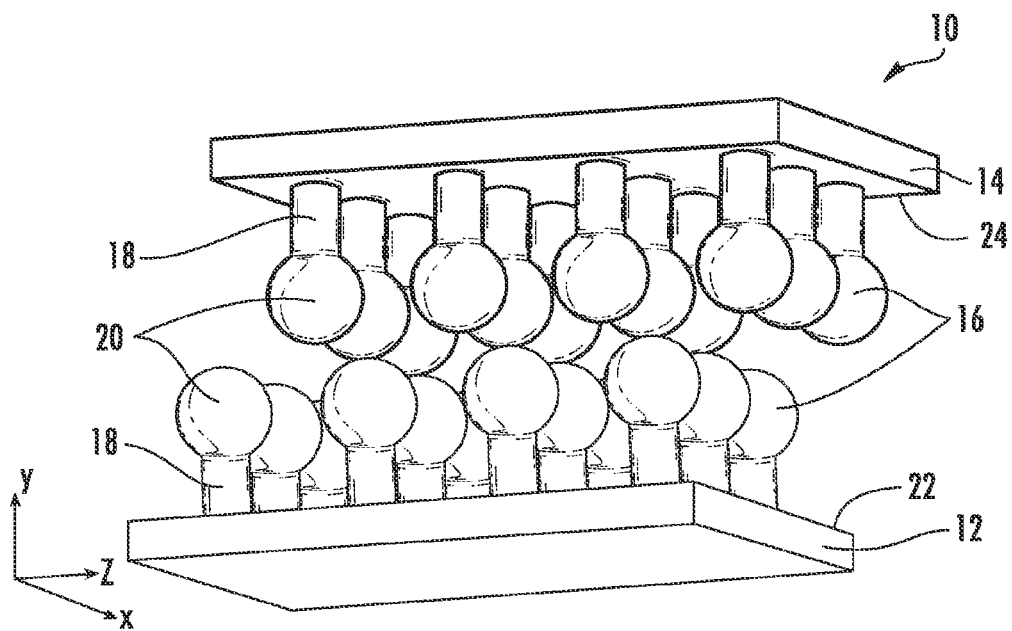
FIG. 1 is a perspective view of an interlocking transition zone in accordance with an example embodiment of the present disclosure, where the first and second components are shown separated to provide a clear view of the projections.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Additive manufacturing technology enables fabrication of complex objects by building objects point-by-point, layer-by-layer, typically in a vertical (Y) direction. Although the discussion below refers to the addition of material, one skilled in the art will appreciate that the methods and structures disclosed herein may be practiced with any additive manufacturing technique or technology. For example, embodiments of the present invention may use layer-additive processes, layer-subtractive processes, or hybrid processes. In some embodiments, the method and structure disclosed herein may provide two or more components joined by an interlocking transition zone 10 and formed by successively depositing layers of one or more materials.

Embodiments of the present disclosure provide methods and structures for joining two or more components using additive manufacturing technology. In this regard, multiple components may be created that are independent entities, but that are created with interlocking features in their construction to effectively form mechanical "roots" that reach across a bonding region, thereby resisting disassembly and carrying structural loading across the transition zone. The resulting joints may be planar or non-planar and may exhibit improved mechanical strength and adhesion. The interlocking material transition zone can also be used, for example, to secure a highly impact resistant protective coating layer to a base material. In addition, the interlocking features may be spaced apart to permit a small range of motion between the components, and the joints may have integrated cooling holes or passageways.

Referring now to the figures, FIG. 1 shows a perspective view of an interlocking transition zone 10 in accordance with an example embodiment of the present disclosure, where a first component 12 and a second component 14 are shown separated to provide a clear view of a plurality of projections 16. As shown, the interlocking transition zone 10 may extend in the in a planar region defined by the X-Z plane. Notably, only the interlocking transition zone 10 is shown in the figures, but one skilled in the art will appreciate that the first component 12 and second component 14 can be any simple or complex object manufactured using additive manufacturing technology. In addition, the first component 12 and second component 14, and the interlocking transition zone 10 connecting them, can be scaled to any size. For example, each projection 16 might range from several nanometers in cross-section to several centimeters or larger. Given its versatility and scalability, the presently disclosed method and structure for joining two or more components using additive manufacturing technology can be practiced in various applications and fields of technology.

Figure 2:
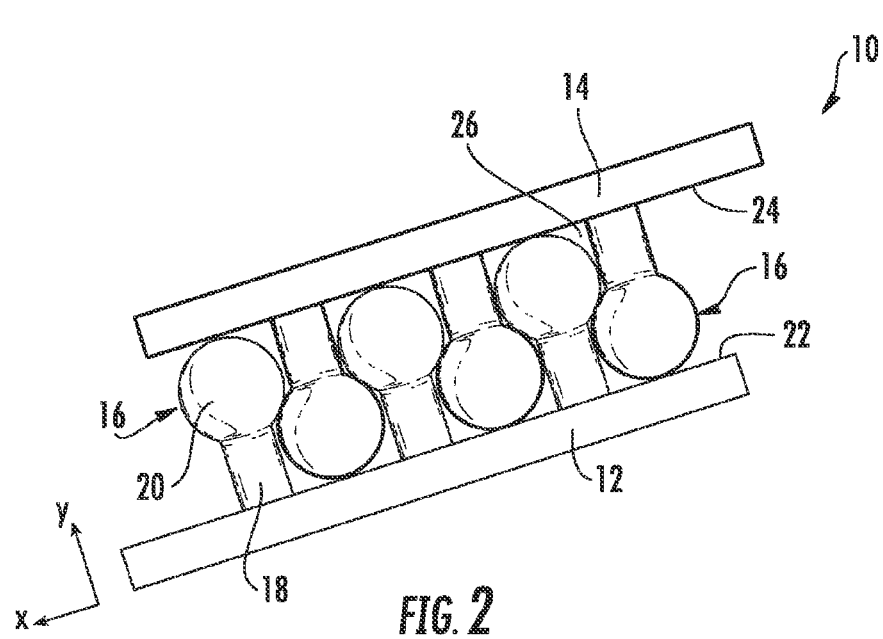
FIG. 2 is a side view of an interlocking transition zone with shaft and knob projections according to an example embodiment.

FIG. 2 is a side view of an interlocking transition zone 10 with shaft 18 and knob 20 projections 16 according to one exemplary embodiment. As shown, each of the first component 12 and second component 14 comprises a plurality of projections 16 extending from a first component surface 22 and a second component surface 24, respectively. Although the illustrated embodiment shows each projection 16 extending in a substantially perpendicular direction, one skilled in the art will appreciate that in other embodiments, each projection 16 may be fabricated at any angle with respect to the component surfaces 22, 24. Each projection 16 comprises a shaft 18 with a knob 20 located at its distal end. In the embodiments illustrated in FIGS. 1 and 2, the shaft 18 is cylindrical and the knob 20 is spherical. However, in some embodiments, the shaft 18 may instead have a cross-section that is square, rectangular, elliptical, irregularly shaped, or any other suitable shape, and may be at common or at different lengths. Similarly, the knob 20 may be square, oblong, or any other suitable shape.

The plurality of projections 16 may alternately extend from the first component 12 and the second component 14 to form an interlocking transition zone 10 extending in both the longitudinal (X) and lateral (Z) direction. In some embodiments, the diameter of knob 20 is larger than the diameter of shaft 18, and the shafts 18 are spaced along the first component 12 and second component 14 such that the knob 20 may fit between adjacent shafts 18. In this manner, the plurality of projections 16 form an interlocking transition zone 10 that mechanically couples the first component 12 and the second component 14. Because the interlocking transition zone 10 may be printed layer-by-layer using additive manufacturing, the resulting interlocking transition zone 10 undetachably couples the first component 12 and the second component 14. In this regard, the first component 12 and the second component 14 are joined such that they may not be separated through non-destructive means. In some embodiments, at least a portion of adjacent projections 16 may prevent relative motion between the components 12, 14. As explained in more detail below, in other embodiments the spacing of the shafts 18 may be adjusted to allow for relative movement of the plurality of projections 16 and provide some flexibility to the interlocking transition zone 10.

Figure 3:
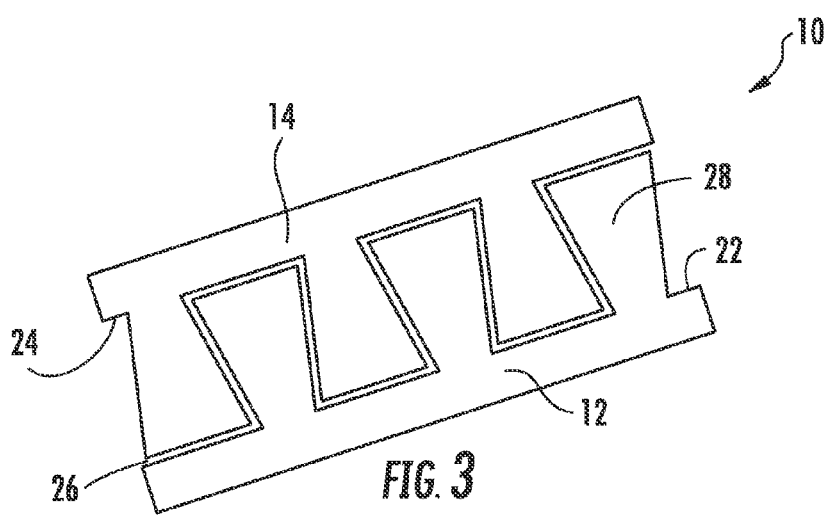
FIG. 3 is a side view of an interlocking transition zone with trapezoidal projections according to an example embodiment.

In some example embodiments, the projections 16 can have a different shape. In this regard, the plurality of projections 16 may be irregularly shaped, and each projection 16 may either fill the entire area between adjacent projections 16, or may leave gaps or small interstices 26. For example, as shown in FIG. 3, the projections 16 may be trapezoidal projections 28. In this regard, each trapezoidal projection 28 has a narrow cross-section proximate to the first component 12 or second component 14, respectively. The cross-sectional area of the trapezoidal projection 28 gets larger as the trapezoidal projection 28 extends away from the first component 12 or second component 14 toward a distal end of the trapezoidal projection 28, where the cross-section is the largest.

Figure 4:
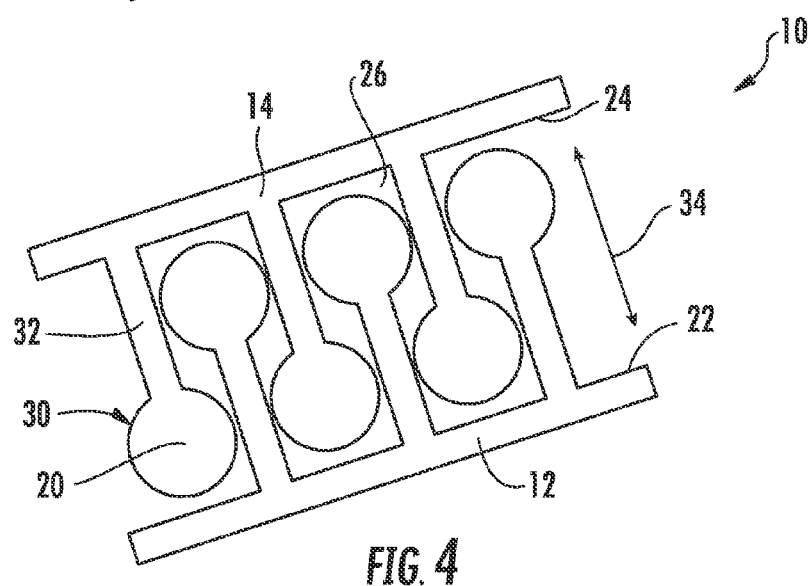
FIG. 4 is a side view of an interlocking transition zone with elongated shaft and knob projections according to an example embodiment.

Referring now specifically to the embodiment of FIG. 4, the plurality of projections 16 may be elongated projections 30. In this regard, the elongated projections 30 may have elongated shafts 32, or may be otherwise fabricated to allow some relative motion between the first component 12 and the second component 14. For example, the elongated shafts 32 may allow the first component 12 and second component 14 to slide relative to each other in the Z-direction (as indicated by arrow 34) until the adjacent knobs 20 come into contact with each other. Similarly, in some embodiments, the spacing of the plurality of projections 16 may be increased so as to permit a small range of motion in the X, Y, and Z planes and rotations about the X, Y, and Z axis. As one skilled in the art will appreciate, the size, shape, and spacing of the plurality of projections 16 may be adjusted to permit or restrict motion as needed for any particular application.

Figure 5:
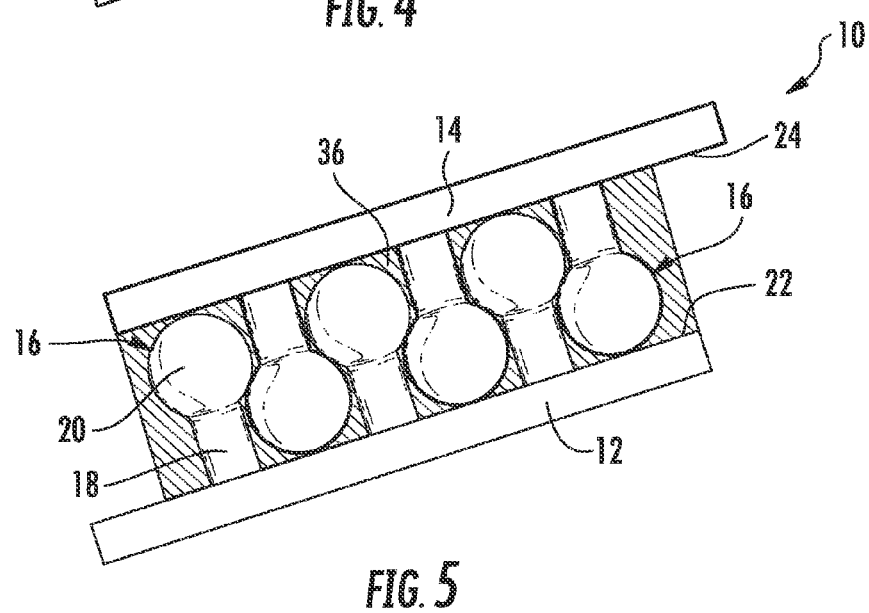
FIG. 5 is a side view of an interlocking transition zone with shaft and knob projections, where a braze material is used as an adhesive between the first and second component according to an example embodiment.

Now referring specifically to FIG. 5, some embodiments of the interlocking transition zone 10 may have an adhesive 36 or other material disposed between the first component surface 22 and the second component surface 24 in order to further ensure a strong bond. This adhesive layer 36 may be, for example, an epoxy or cured resin, or the joint may be made by introduced a brazing filler material between the first component 12 and second component 14. Alternatively, the adhesive layer 36 may be another additively manufactured layer between the first component 12 and the second component 14, and may be made from any material suitable for use in an additive manufacturing process, as discussed below. In this manner, the adhesive layer 36 may improve the mechanical bond strength of the interlocking transition zone 10.

Figure 6:
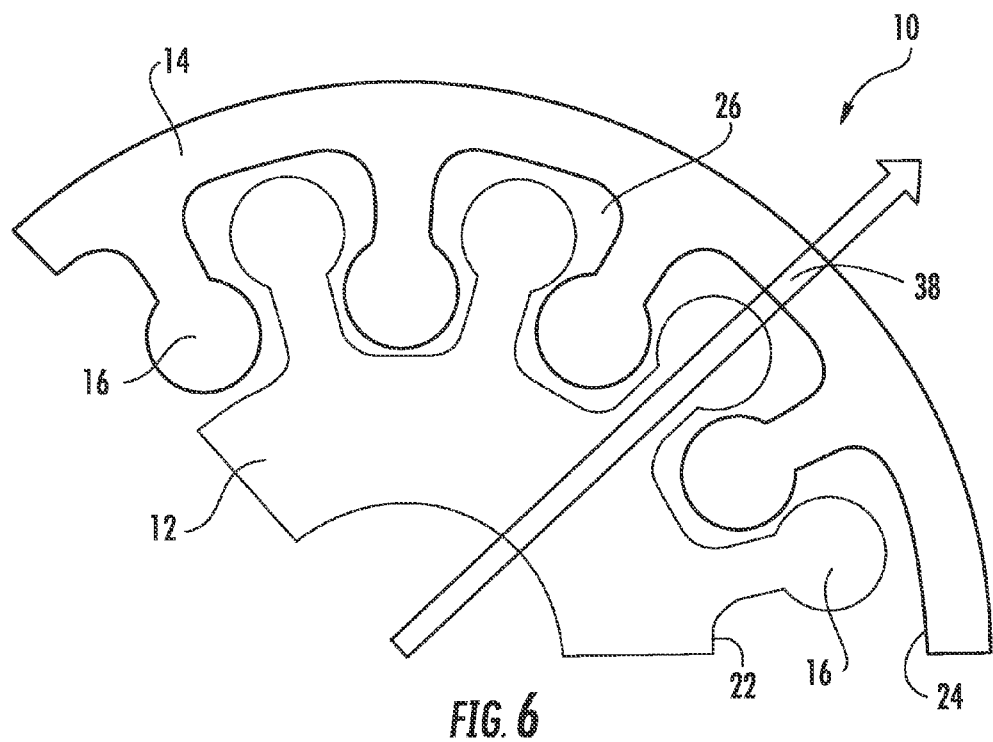
FIG. 6 is a side view of a non-planar interlocking transition zone with a cooling hole extending through according to an example embodiment.
Figure 7:
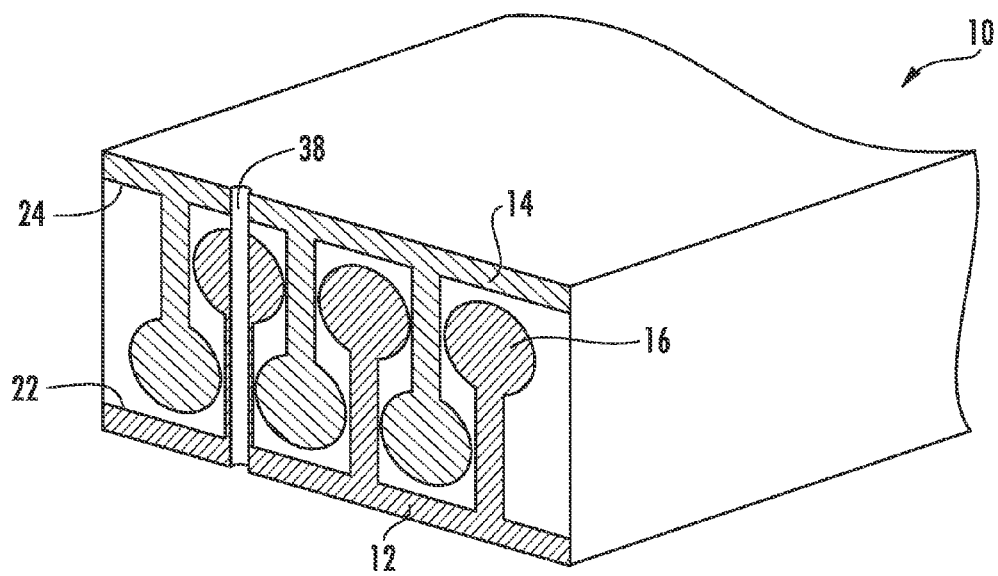
FIG. 7 is a perspective cross-sectional view of an interlocking transition zone with a cooling hole extending through according to an example embodiment.

In some cases, it is desirable to include cooling holes 38 that extend through the interlocking transition zone 10 to provide for communication of cooling fluid between the first component 12 and second component 14 and/or within the interlocking transition zone 10. FIG. 6 shows a side view of a non-planar interlocking transition zone 10 with an integrated cooling hole 38. FIG. 7 is a perspective cross-sectional view of an interlocking transition zone 10 with an integrated cooling hole 38. In these exemplary embodiments, the cooling holes 38 may be formed through the components by selectively depositing material during the additive manufacturing process to form the passageway or cooling hole 38. The cooling holes 38 may extend internally through an interlocking transition zone 10, such that they are self-contained and not exposed to any exterior surface of the joined components. In addition, the cooling holes 38 may be of any shape or size, and may be placed in any location. For example, although the cooling holes 38 depicted in FIGS. 6 and 7 are linear and extend straight through the interlocking transition zone 10 from the first component 12 to the second component 14, the cooling holes 38 may instead be curved or serpentine.

The additive manufacturing process disclosed herein enables the first component 12 and second component 14 to be made of any of a variety of materials. Each component may be made of the same material or of a different material. In fact, even a single component may comprise multiple layers of different materials. In some embodiments, the first component 12 may be a first part and the second component 14 may be a second part, such that the interlocking transition zone 10 creates a multi-part assembly. Moreover, one skilled in the art will appreciate that the method and structure described herein need not be limited to two components, but may be used to join more than two components. In some embodiments, the first component 12 may be a base material and the second component 14 may be a protective coating. For example, the second component 14 may be a thermal barrier coating or a bond coat of thermal barrier coating to provide improved thermal durability to the first component 12. In other embodiments, the protective coating may be a very durable material exhibiting high impact resistance. In this manner, the protective coating may protect the underlying component from impact damage and extend its lifetime.

As indicated above, the second component 14 may be a protective coating, such as a thermal barrier coating (TBC) system or an environmental barrier coating (EBC) system. Such TBC and EBC systems may generally include a bond layer covering the outer surface of the first component 12 and a thermal barrier layer disposed over the bond layer. As is generally understood, the bond layer may be formed from an oxidation resistant metallic material designed to inhibit oxidation and/or corrosion of the underlying first component 12. For instance, in several embodiments, the bond layer may be formed from a material comprising "MCrAlY," where "M" represents iron, nickel or cobalt, or from an aluminide or noble metal aluminide material (e.g., platinum aluminide). Similarly, the thermal barrier layer may be formed from a temperature resistant material in order to increase the operating temperature capability of the first component 12. For example, in several embodiments, the thermal barrier layer may be formed from various known ceramic materials, such as zirconia partially or fully stabilized by yttrium oxide, magnesium oxide or other noble metal oxides.

Moreover by using the methods and structures disclosed above to create an interlocking transition zone 10, the bond layer of the TBC and EBC systems may be eliminated altogether. In this regard, the bond layer is typically used in TBC and EBC systems in order to provide an intermediate layer between the first component 12 and the thermal barrier coating to compensate for thermal mismatching—i.e., the first component 12 and thermal barrier coating may have different coefficients of thermal expansion, causing stresses as the materials grow at different rates when placed in high temperature environments. The bond layer provides additional mechanical strength and adhesion to ensure the thermal mismatching does not result in bonding region failure. However, as discussed above, the plurality of projections 16 form an interlocking transition zone 10 that provides a strong mechanical bond and improved adhesion between components. Therefore, if an interlocking transition zone 10 couples a protective thermal barrier coating to the first component 12, the bond layer may be eliminated altogether and the assembly can still withstand high temperature environments.

In addition, one skilled in the art will appreciate that a variety of materials and methods for bonding those materials may be used and are contemplated as within the scope of the present disclosure. For example, the material may be plastic, metal, concrete, ceramic, polymer, epoxy, photopolymer resin, or any other suitable material that may be in solid, liquid, powder, sheet material, or any other suitable form. As used herein, references to "fusing" may refer to any suitable process for creating a bonded layer of any of the above materials. For example, if an object is made from polymer, fusing may refer to creating a thermoset bond between polymer materials. If the object is epoxy, the bond may be formed by a crosslinking process. If the material is ceramic, the bond may be formed by a sintering process. If the material is powdered metal, the bond may be formed by a melting process. One skilled in the art will appreciate other methods of fusing materials to make a component by additive manufacturing are possible, and the presently disclosed subject matter may be practiced with those methods.

In some embodiments, the first material and the second material have different coefficients of thermal expansion. In such embodiments, it may be desirable to configure the plurality of projections 16 to allow some relative movement, thereby reducing the likelihood of failure due to concentrated stresses resulting from thermal growth mismatch.

Additive manufacturing technology enables the creation of multiple components that are independent entities, but that are created with interlocking features in their construction to limit their range of motion and/or disassembly. In this regard, two or more independent components can be fabricated with interlocking features that effectively form mechanical "roots" that reach across a interlocking transition zone 10, resist disassembly, and have the capacity to carry structural loading across the interlocking transition zone 10. The ability to effectively join two or more components using additive manufacturing technology introduces a wide range of planar or non-planar joints, and can enable the creation of unique assemblies.

The interlocking material transition zone 10 can provide technical and commercial advantages over the prior art. Joints created using the described method have improved mechanical strength, exhibiting improved shear bonding between regions of different function, composition, or microstructures, and enhanced adhesion at the micro or macro scale. The interlocking material transition zone 10 can also be used, for example, to secure a highly impact resistant protective coating layer to a base material. Bond layer versatility is also improved in that the components may be made of the same or dissimilar material, and the joints may be planar or non-planar. In addition, the interlocking features may be spaced apart to permit a small range of motion between the components, and the joints may have integrated cooling holes or passageways.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed:

1. An additively manufactured component, comprising:
   a first component comprising a plurality of fused layers of a first material;
   a second component comprising a plurality of fused layers of a second material; and
   an interlocking transition zone comprising a plurality of projections alternately extending from the first component and the second component, respectively, to undetachably couple the first component and the second component,
   wherein the first component and the second component are made from a powdered metal, and the plurality of fused layers are formed by a melting process.

2. The additive manufactured component as in claim 1, wherein at least a portion of adjacent projections between the first component and the second component prevent relative motion between the first component and second component.

3. The additively manufactured component of claim 1, wherein each of the plurality of projections allow relative motion between the first component and the second component.

4. The additively manufactured component of claim 1, wherein each projection comprises a shaft extending from the first component or the second component, a distal end of the shaft further comprising a knob having a diameter larger than the diameter of the shaft.

5. The additively manufactured component of claim 1, wherein the first material is different from the second material.

6. The additively manufactured component of claim 1, wherein the first component and the second component are made of a polymer material, and the plurality of fused layers are formed by a thermosetting process.

7. The additively manufactured component of claim 1, wherein the first component and the second component are made of epoxy, and the plurality of fused layers are formed by a crosslinking process.

8. The additively manufactured component of claim 1, wherein the first component and the second component are made of a ceramic material, and the plurality of fused layers are formed by a sintering process.

9. The additively manufactured component of claim 1, wherein each of the plurality of projections has a trapezoidal shape that extends from the first component or the second component such that a widest portion of each trapezoid is disposed at a distal end of the projection from the first component or the second component, respectively.

10. The additively manufactured component of claim 1, wherein the second component is a protective coating.

11. The additively manufactured component of claim 10, wherein the protective coating is a thermal barrier coating.

12. The additively manufactured component of claim 10, wherein the protective coating is a bond coat of a thermal barrier coating.

13. The additively manufactured component of claim 1, wherein the first material has a first coefficient of thermal expansion and the second material has a second coefficient of thermal expansion, wherein the first coefficient of thermal expansion is different than the second coefficient of thermal expansion.

14. The additively manufactured component of claim 1, wherein the interlocking transition zone has a fluid channel formed therein, wherein the fluid channel is configured to allow a fluid to flow through the interlocking transition zone.

15. The additively manufactured component of claim 1, wherein a brazed joint is located between the first component and the second component to act as adhesive.

* * * * *